(12) United States Patent
Rittmann et al.

(10) Patent No.: US 9,869,349 B2
(45) Date of Patent: Jan. 16, 2018

(54) BUSHING

(71) Applicant: FEDERAL-MOGUL WIESBADEN GMBH, Wiesbaden (DE)

(72) Inventors: Stefan Rittmann, Kirchheimbolanden (DE); Klaus Kirchhof, Niedernhausen (DE); Mateusz Michalski, Wiesbaden (DE)

(73) Assignee: Federal-Mogul Wiesbaden GmbH, Wiesbaden (DE)

( * ) Notice: Subject to any disclaimer, the term of this patent is extended or adjusted under 35 U.S.C. 154(b) by 0 days.

(21) Appl. No.: 15/123,291

(22) PCT Filed: Mar. 2, 2015

(86) PCT No.: PCT/EP2015/054273
§ 371 (c)(1),
(2) Date: Sep. 2, 2016

(87) PCT Pub. No.: WO2015/132188
PCT Pub. Date: Sep. 11, 2015

(65) Prior Publication Data
US 2017/0074321 A1 Mar. 16, 2017

(30) Foreign Application Priority Data

Mar. 4, 2014 (DE) .................. 10 2014 203 913

(51) Int. Cl.
*F16C 33/04* (2006.01)
*F16C 17/02* (2006.01)
(Continued)

(52) U.S. Cl.
CPC ............ *F16C 33/046* (2013.01); *F16C 17/02* (2013.01); *F16C 17/10* (2013.01); *F16C 33/128* (2013.01);
(Continued)

(58) Field of Classification Search
CPC ..................................... F16C 33/046
See application file for complete search history.

(56) References Cited

U.S. PATENT DOCUMENTS 578,801 A * 3/1897 Wilmot ............... B21D 39/037
138/156
1,298,100 A 3/1919 Royce
(Continued)

FOREIGN PATENT DOCUMENTS

DE 2818378 A1 11/1978
DE 3316767 A1 12/1984
(Continued)

OTHER PUBLICATIONS

Machine translation of EP0451884 Jun. 22, 2017.*
International Search Report, dated May 18, 2015 (PCT/EP2015/054273).

*Primary Examiner* — Thomas R Hannon
(74) *Attorney, Agent, or Firm* — Robert L. Stearns; Dickinson Wright, PLLC

(57) ABSTRACT

A plain bearing bushing is formed from a material strip, wherein a first joining end of the material strip has a projection and a second joining end has a recess interacting with the projection, a base side of the projection being oriented towards the first joining end. A bushing is to be provided that is designed to be more advantageous with respect to the production method, in particular during the forming process, and with respect to dimensional tolerance and long-term stability. This is achieved by a bushing with clamping elements in which the joining ends of the material strip are fixed both in axial direction and in circumferential direction of the bushing in a frictionally engaged and/or formfitting manner.

10 Claims, 5 Drawing Sheets

Figure 1:
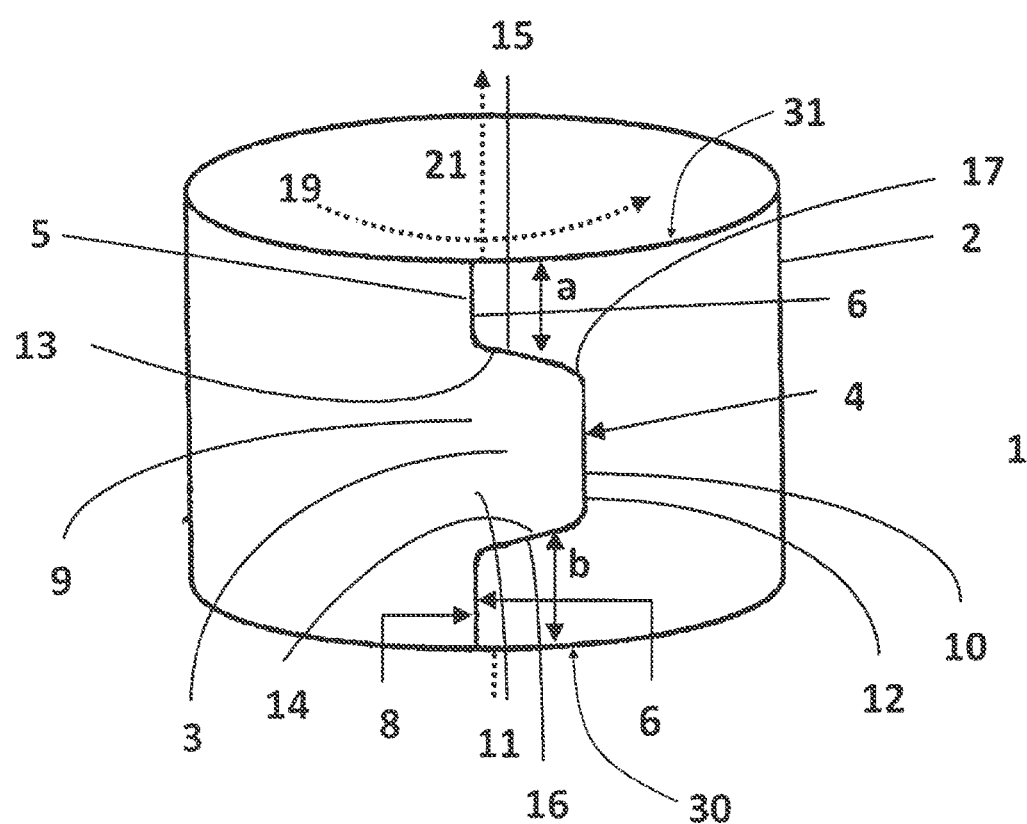

(51) Int. Cl.
*F16C 33/20* (2006.01)
*F16C 17/10* (2006.01)
*F16C 33/12* (2006.01)

(52) U.S. Cl.
CPC ............ *F16C 33/206* (2013.01); *F16C 33/12* (2013.01); *F16C 2226/76* (2013.01); *F16C 2240/30* (2013.01)

(56) References Cited

U.S. PATENT DOCUMENTS

| | | | |
|---|---|---|---|
| 2,177,584 A * | 10/1939 | Salansky | B21K 25/00 |
| | | | 29/898.056 |
| 2,283,918 A | 5/1942 | Dekome | |
| 2,762,117 A * | 9/1956 | Houck | B21D 39/037 |
| | | | 16/2.1 |
| 2,855,252 A | 10/1958 | Budinger et al. | |
| 4,180,895 A | 1/1980 | Spikes et al. | |
| 4,909,638 A | 3/1990 | Muto | |
| 4,988,217 A | 1/1991 | Iijima | |
| 6,345,599 B1 | 2/2002 | Pfestorf et al. | |
| 7,025,393 B2 | 4/2006 | Amedure et al. | |
| 7,794,609 B2 | 9/2010 | Egan, III | |
| 9,206,843 B2 * | 12/2015 | Hauk | B21D 53/10 |

FOREIGN PATENT DOCUMENTS

| | | |
|---|---|---|
| DE | 3511125 A1 | 10/1985 |
| DE | 4019055 C1 | 11/1991 |
| DE | 19837596 C1 | 1/2000 |
| EP | 0218274 A1 | 4/1987 |
| EP | 0451884 A2 | 10/1991 |
| EP | 1248005 B1 | 8/2006 |
| GB | 2139297 A | 11/1984 |
| WO | 2007087771 A1 | 8/2007 |

* cited by examiner

BUSHING

BACKGROUND OF THE INVENTION

1. Technical Field

The invention relates to a bushing, in particular a plain bearing bushing, with cylindrical lateral surface, which is formed from a material strip such that in circumferential direction two joining ends are arranged adjacently, wherein, at a first joining end, is arranged a projection and, at a second joining end, is arranged a recess engaging in formfitting manner with the projection.

2. Related Art

Such bushings have been known for a long time and are used in the most diverse technical areas. By way of example for the state of the art the documents DE 3511125 A1, DE 3316767 A1, U.S. Pat. No. 1,298,100, EP 1248005 B1 or the WO 2007/087771 A1 are stated.

As standard, bushings are manufactured by forming processes, in particular rolling or bending, of a material strip. At that, the two joining ends of the material strip have interlocking elements corresponding to each other that are moved towards each other in a tangential way during the forming process and eventually are interlocked with each other. The joining ends mark the sides of the material strip between which a butt joint is formed after the forming process. Typically, an interlocking element in form of a journal is configured with undercuts and the other interlocking element in form of a recess with which the journal engages for axial and circumferential fixation. These interlocking elements are not exactly complementary at the beginning of the forming process. The joining end with recess rather has small tails firstly on one side or on both sides of the recess, folded into the undercuts of the journal when journal and recess are pushed into each other, creating a formfitting fixation of the joining ends in circumferential direction, which is called a "clinch connection." During folding the materials is formed.

In addition, interlocking elements are known with which the journal has a larger extension in circumferential direction of the bushing than the complementary recess that in turn is configured wider in axial direction of the bushing than the corresponding journal. This is described for example in U.S. Pat. No. 2,283,918. When journal and recess are pushed into each other, the journal first is clinched as soon as it touches the edge area of the recess opposite the opening of the recess. When the joining ends are further moved towards each other, the clinched material evades in axial direction into the space between the journal and recess, creating further undercuts. Thus, a formfitting connection of the joining ends results in circumferential direction of the bushing as well.

In both cases described, a formfitting connection, a clinch, results from material forming processes. These methods of bushing production by way of material forming process do have the disadvantage that the accuracy of the form fit depends substantially on material flow during joining. Practical experience has shown that not in all cases a suitable form fit can be achieved, which in certain cases results in loosening of the interlocking elements and thus in the entire bushing yielding in the bearing bore. In order to reduce this risk, stricter controls of the interlocking elements are required, which increases both rejects and production costs of the bushing.

Similar interlocking elements that are subject to a material forming process during joining are also known from other technical areas. By way of example, specifications U.S. Pat. No. 7,025,393 B2 or U.S. Pat. No. 7,794,609 B2 are referred to.

To overcome the issues described, bushings with smooth joining ends or at least joining ends without undercuts are used for very precise applications with low dimensional tolerance. Such bushings, for example, are known from EP 0 218 274, DE 198 37 596 C1, DE 28 18 378 A1 or U.S. Pat. No. 4,909,638. With these bushings the interlocking elements are arranged exactly complementary to each other. This results in these interlocking elements engaging with each other in a formfitting manner even without any material forming process. This kind of interlocking, however, has the disadvantage that due to the exactly complementary interlocking elements very close production tolerances must be observed during the forming process to avoid damage to the journal or the recess and any resulting reject of the bushing. Another disadvantage results from the formfitting fixation of the joining ends only in axial direction of the bushing and thus no creation of a clinch connection. Thus there is no formfitting fixation in circumferential direction of the bushing. Consequently, it will not be possible to close the bushing without a gap, which makes any subsequent processing and the installation in the respective bearings very difficult.

From specification DE 40 19 055 C1 another bushing with interlocking elements in the form of wedging projections and recesses is known, the wedge angle of the wedge surfaces capable of being engaged with each other being larger than the self-retaining angle. The wedge angles thus have deliberately been chosen in a way to ensure that the bushing is able to expand radially outwards.

Accordingly, this is a bushing that cannot be closed without a gap either. Against this background, it is the objective of the invention to provide a bushing that mostly overcomes the disadvantages of the state of the art.

SUMMARY OF THE INVENTION

According to the invention, the bushing of the initially stated kind is characterised in that the projection and the recess at the joining ends of the material strip of the bushing are capable of being introduced into each other in circumferential direction and being joined together in a frictionally engaged manner.

The projection and the recess at the joining ends of the material strip therefore are also summarised under the term clamping elements. This frictionally engaged connection has the advantage that the formed bushing is configured substantially more resistant to external force and thus to deformation in circumferential direction. This results in a significant extension of service life of the bushing and savings in costs and material. Additionally, the frictionally engaged connection enables a gap-free closure of the bushing in its circumferential direction which avoids leaking of lubricants or other substances into the mounting of the bushing and thus loosening the bushing and a contingent failure of the bushing. The frictionally engaged connection provides another advantage in that the bushing can be produced in its final form in a free-standing manner already. This significantly facilitates the installation into the respective bushing bearing. The bushing does not need to be pressed together prior to installation but can be directly pushed into the bearing bore. This circumstance results in a reduction of assembly time and costs.

Advantageous is an embodiment in which, seen in projection onto the lateral surface, the projection is tapered in circumferential direction from its base side adjacent to the first joining end towards its free end in a kind that it forms no undercut. The recess is preferably configured complementary to the projection.

The base side of the projection hereinafter is also referred to as "long base side" of the projection; the opposite "short base side" of the projection forms the free end. The clamping elements in this configuration have neither a tail nor a cavity that will need to be bent or filled by a respective material flow during the forming process. Thus, the embodiment according to the invention enables a frictionally engaged connection of the joining ends of a material strip in circumferential direction of the bushing without any material forming or material flow.

Consequently, bushings can be produced with substantially lower dimensional tolerances. It is also advantageous that the clamping elements can be introduced into each other more easily and additionally the projection is centred more easily within the recess.

According to an advantageous development of the bushing according to the invention, the projection has two leg sides spaced apart in axial direction of the bushing of which a first leg side includes an angle $\alpha_1$ with the circumferential direction from 5° to 30° and a second side surface includes an angle $\alpha_2$ with the circumferential direction from 0° to 60°. In a particularly advantageous embodiment, the sum of angles $\alpha_1$ and $\alpha_2$ lies in a range between 10° and 60°. The same applies to angles $\beta_1$ and $\beta_2$ between the respective complementary first and second leg sides of the recess, respectively, and the circumferential direction.

According to the invention, angles $\alpha_1$ and $\alpha_2$ advantageously are of the same size. In particular, in an angle range from 5° to 30° for angles $\alpha_1$, $\beta_1$ and $\alpha_2$, $\beta_2$, the friction between the surfaces of the respectively touching leg sides of the projection and the recess is sufficient for secure clamping. In addition, force distribution is identical due to angle symmetry and the centering of the projection in the recess during the forming process is particularly secure.

Another advantageous development of the bushing according to the invention has a trapezoidal or trapezoid-shaped projection. This shape has the advantage that on the one hand the clamping elements can be introduced into each other particularly effortlessly in a fractionally engaged and formfitting manner and on the other hand the frictional connection is optimised.

Advantageously, the projection has a height $h_3$ in circumferential direction between 2 and 8 mm, height $h_3$ describing the largest distance of the base side to the opposite short base side of the projection.

Advantageously, the projection has a length $L_9$ of the long base side of between 2 and 6 mm.

The frictionally engaged connection of the joining ends according to the invention advantageously allows forming also material strips made of porous sintered materials or expanded metals, in particular with impregnated plastic sliding material, to bushings and mutually fixing the joining ends of the same in circumferential direction. Porous and brittle materials, such as expanded metal or a metallic sintered material with impregnated plastic sliding layer, due to their lower tensile strength are not quite suitable to create the known interlocking connections at the joining ends through plastic deformation of the interlocking elements. Generally, an interlocking connection with undercut made of these materials can be damaged more easily, which can even result in failure of the bushing. With the bushing according to the invention, force between the clamping elements is transmitted substantially more homogeneously and without or almost without plastic deformation of the material, enabling a significant extension of service life of the bushing even with sensitive materials with effective fixation of the ends.

In another advantageous embodiment, the plain bearing bushing has at least one thrust washer at the axial front side.

If thrust washers are joined directly onto the bushing by way of forming the material strip, the bushing due to restoring forces increasingly tends to open. Therefore, especially with such bushings, high forces occur at the clamping elements and the material strip to which in particular material strips made from a porous sintered material or an expanded metal with impregnated plastic sliding material regularly do not resist due to their lower tensile strength. The tensile load results in the failure of mutually frictionally engaging interlocking elements during or after the forming process and thus in actual fact to the opening of the bushing. Due to the fractionally engaged connection between the clamping elements, the plain bearing bushing according to the invention brings about a significant improvement. The frictionally engaged clamping between the projection and the recess especially with the said structurally weaker materials is substantially more resistant in case of tensile load in circumferential direction than a form fit.

In another advantageous embodiment of the plain bearing bushing, the projection and the recess are arranged in the axial centre of the bushing.

With a plain bearing bushing without thrust washer, the clamping elements are thus located in the centre of the material strip from which the bushing is formed. With bushings with a one-sidedly joined thrust washer, the clamping elements are located outside of the centre of the material strip. And with a bushing with thrust washers joined at both front sides, the projection and the recess in turn are preferably arranged in the axial centre of the formed bushing.

These embodiments are preferred for reasons of symmetry.

THE DRAWINGS

Further features and advantages of the invention are hereinafter explained in more detail using the figures.

Figure 2:
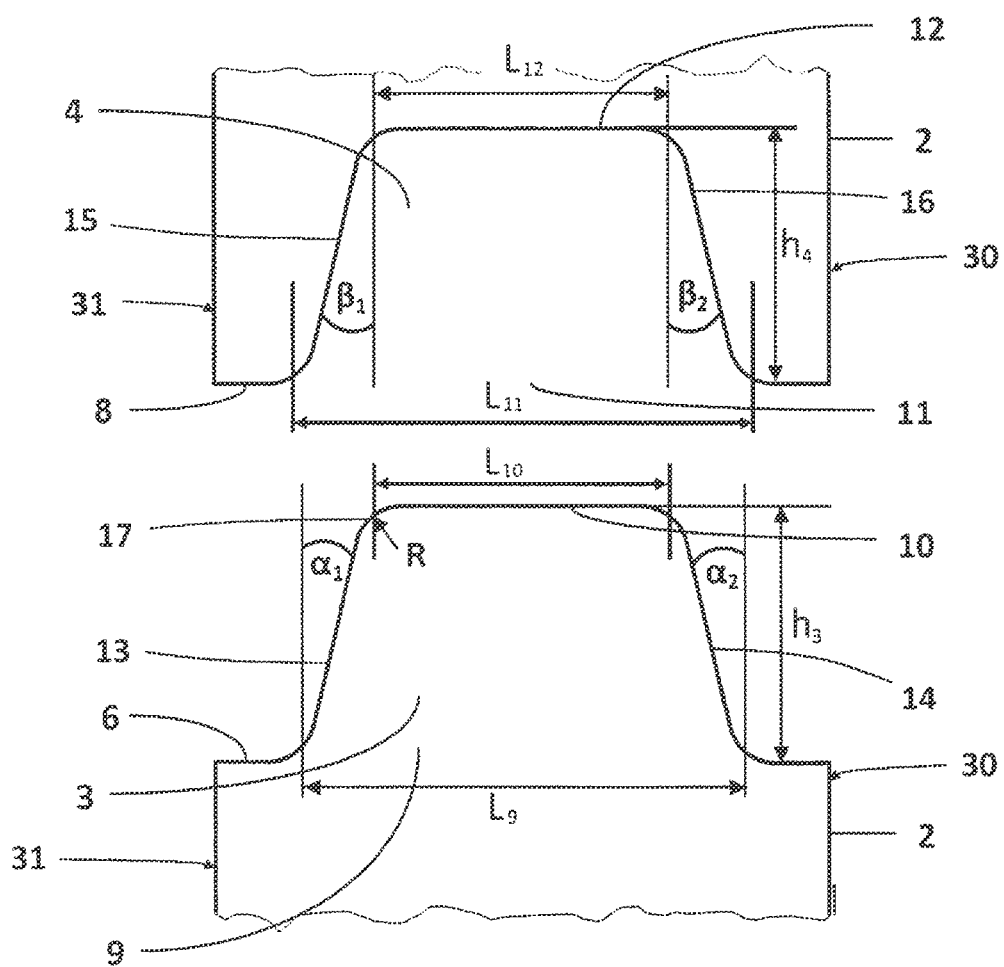
Figure 3:
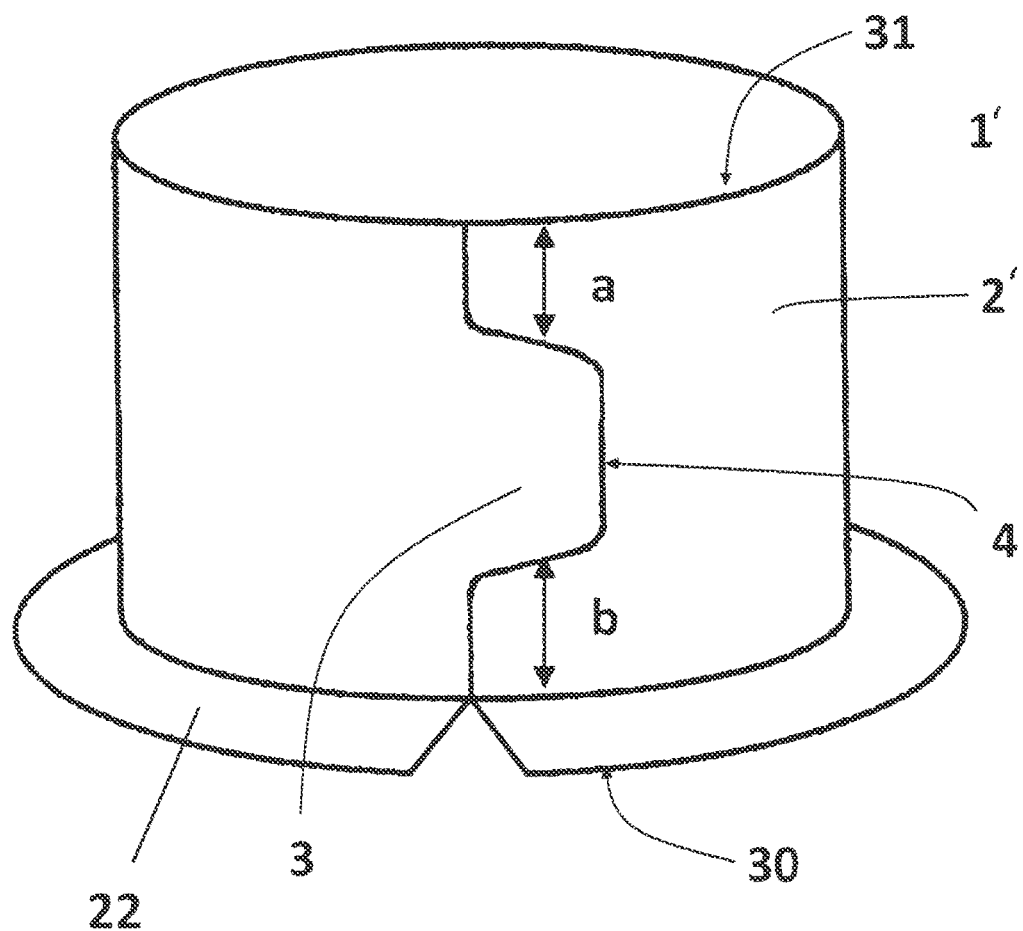
Figure 4:
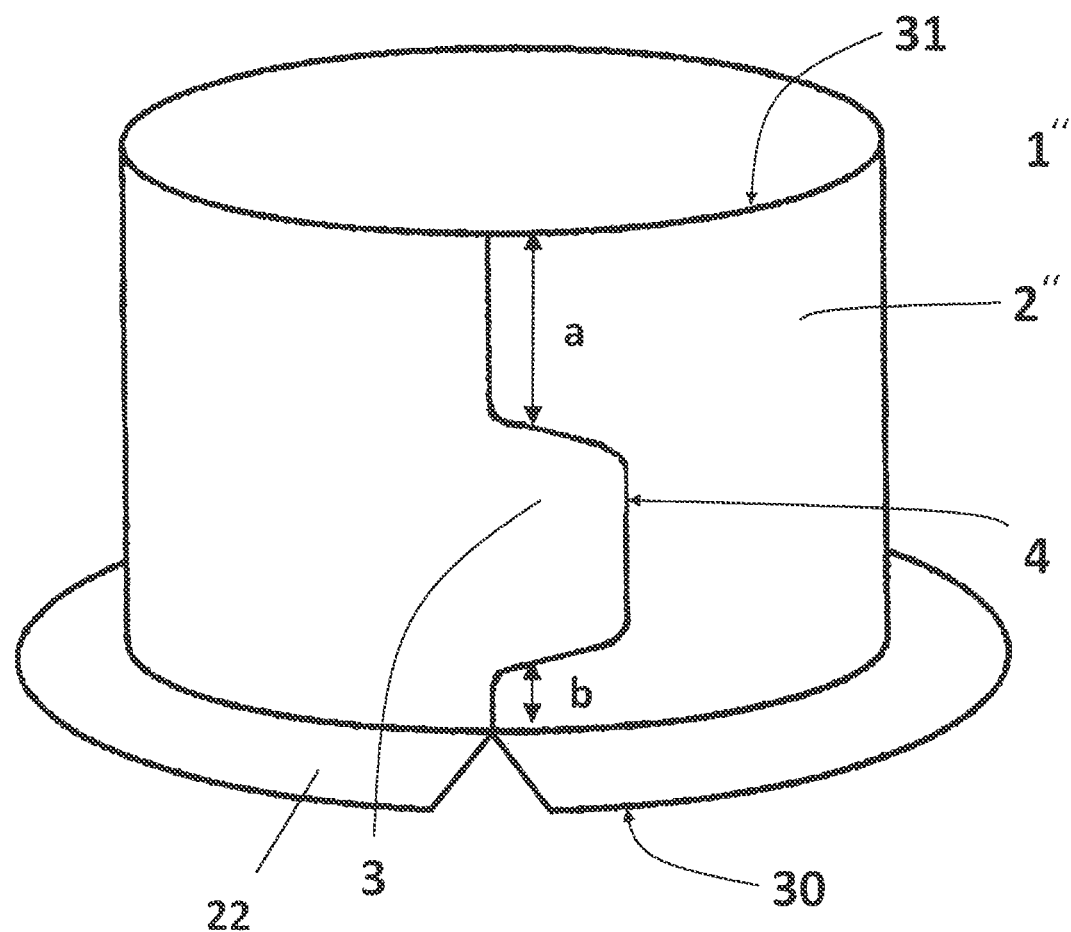
Figure 5:
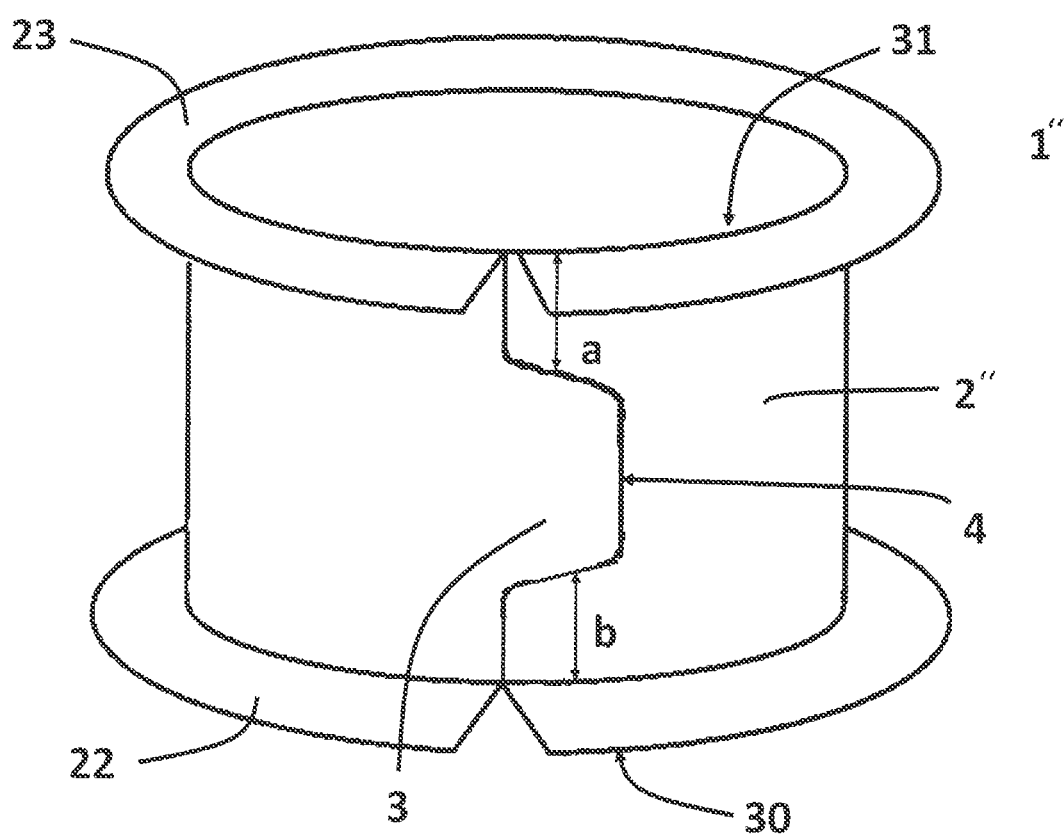

FIG. 1 shows a schematic illustration of a formed plain bearing bushing with trapezoidal wedge clamping, FIG. 2 shows an enlarged schematic illustration of the trapezoidal clamping elements, FIG. 3 shows a schematic illustration of a plain bearing bushing with trapezoidal wedge clamping and a joined thrust washer, FIG. 4 shows a schematic illustration of a formed plain bearing bushing with trapezoidal wedge clamping and a first thrust washer formed from the material strip prior to joining a second thrust washer, FIG. 5 shows a schematic illustration of a formed plain bearing bushing according to FIG. 4 after joining a second thrust washer.

DETAILED DESCRIPTION

In FIG. 1 an exemplary embodiment of plain bearing bushing 1 according to the invention is shown that is made by forming, in particular by rolling or bending, from a material strip 2. Bushing 1 has trapezoidal clamping elements in form of a projection 3 at a first joining end 6 of material strip 2 and a recess 4 interacting with and complementary to the projection 3 at a second joining end 8 of material strip 2. Projection 3 and recess 4 are formed such that they are capable of being introduced into each other and of being connected to each other in a frictionally engaged manner.

To explain the geometry of the clamping elements according to the invention, FIG. 2 includes an enlarged illustration of joining ends 6 and 8 of material strip 2 according to FIG. 1. For the purpose of clarity, the joining ends are shown spaced apart from each other. Projection 3 has two base sides 9 and 10. Base side 9 is the longer one of the base sides and adjoins the first joining end 6, more precisely the front side of the first joining end 6 of material strip 2. Base side 9 thus forms the imaginary connection line between the shoulders of joining end 6 at the side of projection 3. The shorter base side 10 is arranged in parallel to base side 9 at the free end of the projection. $L_9$ and $L_{10}$ mark the lengths of base sides 9 and 10 of projection 3.

Complementarily to the projection, recess 4 has a longer base side 11 and a shorter base side 12 opposite to base side 11. Base side 11 is located at the level of the second joining end 8, more precisely of the front side of the second joining end 8 of material strip 2. Base side 12 in parallel to base side 11 in circumferential direction 19 is arranged offset into material strip 2. $L_{11}$ and $L_{12}$ mark the lengths of base sides 11 and 12 of recess 4.

Projection 3 further has two leg sides 13, 14 spaced apart in axial direction 21 of bushing 1 and the recess has two corresponding leg sides 15 and 16.

If corners 17 of projection 3 or recess 4 are rounded off, which is indicated by curvature radius R in FIG. 2, thus lengths $L_9$, $L_{10}$, $L_{11}$ and $L_{12}$ are determined by the intersection points of extended leg sides 13, 14, 15 and 16 with extended base sides 9, 10, 11 and 12.

Seen in projection onto the lateral surface of bushing 1, both clamping elements 3 and 4 taper in circumferential direction 19 from the first towards the second joining end (FIG. 1). Projection 3 tapers from its base side 9 towards its shorter base side 10. Consequently, projection 3 forms no undercuts. In the same direction, recess 4 tapers from its longer base side 11 towards its shorter base side 12 inside material strip 2. Thus applies $L_9 > L_{10}$ and $L_{11} > L_{12}$.

Projection 3 has a height $h_3$ that is defined by the largest distance between base side 9 and opposite shorter base side 10. It preferably is between 2 and 8 mm. Length $L_9$ of base side 9 preferably is between 2 and 6 mm. Accordingly, recess 4 has a height $h_4$ preferably of the same kind and substantially of the same dimension.

With circumferential direction 19 of bushing 1, leg sides 13, 14 include angles $\alpha_1$ and $\alpha_2$. Complementarily to this, with circumferential direction 19 of bushing 1, leg sides 15 and 16 of recess 4 spaced apart in axial direction 21 of bushing 1 include angles $\beta_1$ and $\beta_2$. Leg side 13 of projection 3 and leg side 15 of recess 4 as well as leg side 14 of projection 3 and leg side 16 of recess 4 respectively adjoin each other after the forming of material strip 2 and the introduction of projection 3 in recess 4. Angles $\alpha_1$ and $\beta_1$, and $\alpha_2$ and $\beta_2$, respectively, are substantially complementary.

In particular, angle $\alpha_1$ is between 5° and 30° and angle $\alpha_2$ is between 0 and 60°.

Corners 17 of projection 3 located between leg sides 13, 14 and short base side 10 can taper or, as previously stated, can have a curvature radius R. The ratio $R/h_3$ of radius R to height $h_3$ of projection 3 preferably is in the range between 0 and 0.5.

Recess 4 is configured such that as a result of the forming process projection 3 and recess 4 engage in a formfitting manner in axial direction 21 of bushing 1 and in frictionally engaged manner in circumferential direction 19 of bushing 1.

In one embodiment of bushing 1 according to the invention, clamping elements 3, 4 are exactly complementary to each other. Corresponding leg side pairs 13, 15 and 14, 16, base pairs 9, 11 and 10, 12 as well as angle pairs $\alpha_1$, $\beta_1$ and $\alpha_2$, $\beta_2$ of projection 3 and recess 4 are identical in their position and in their amount.

In another embodiment of plain bearing bushing 1 shown in FIG. 1, projection 3 and recess 4 are not exactly complementary to each other. That means, at least one of the leg side pairs 13, 15 and/or 14, 16 and/or of the base side pairs 9, 11 and/or 10, 12 and/or the angle pairs $\alpha_1$, $\beta_1$ and/or $\alpha_2$, $\beta_2$ differ from each other in their form that a reinforced clamping effect is ensured.

Preferably, for at least one of the angle pairs $\alpha_1 < \beta_1$ or $\alpha_2 < \beta_2$ and the base side pair 10, 12 $L_{10} > L_{12}$ applies. Alternatively, for at least one of the angle pairs $\alpha_1 > \beta_1$ or $\alpha_2 > \beta_2$ and the base side pair 9, 11 $L_9 > L_{11}$ applies. Alternatively, with identical angles $\alpha_1 = \beta_1$ and $\alpha_2 = \beta_2$ both base sides 9, 10 of projection 3 can be chosen longer than the corresponding base sides 11, 12 of recess 4: $L_9 > L_{11}$, and $L_{10} > L_{12}$. The differences admittedly are only little and preferably amount to only few percent of the respective dimensions. In this sense, the exactly complementary and the not exactly complementary clamping elements herein are referred to as (substantially) "complementary."

Material strip 2 used to be form into bushing 1 can be designed in the known manner in one layer or consist of a layered compound structure with different functional layers. In particular, this compound structure can have a supporting expanded metal layer or a steel back and a porous sintered metal layer, each in connection with an impregnated plastic sliding layer, for example based on PTFE.

The plain bearing bushing 1 shown in FIGS. 1 and 2 according to the invention is an embodiment the clamping elements 3 and 4 of which are arranged in the axial centre of material strip 2. Consequently, the central distances a and b between leg sides 13 and 14, respectively, on the one hand, and 15 and 16, respectively, on the other hand, are of the same size as the respective adjacent front sides 30 and 31 of plain bearing bushing 1. If plain bearing bushing 1 does not have a thrust washer, clamping elements 3 and 4 then also are located in the axial centre of bushing 1.

In FIG. 3 a schematic illustration of plain bearing bushing 1' with thrust washer 22 is shown. This thrust washer 22 preferably is produced by forming a single-piece material strip 2'. It defines the front side 30 of the bushing. The clamping elements 3 and 4 in turn are arranged in the axial centre of the bushing 1, so the distances a and b are of the same size. Due to material required for the thrust washer 22, the clamping elements 3 and 4, however are not arranged in the centre of the original material strip 2.

FIG. 4 shows another plain bearing bushing 1" with a thrust washer 22 formed on one side. This represents an intermediate state of bushing 1" which, after the installation into a bearing seat, will be equipped with a thrust washer on the opposite open front side 31 by forming as well. In contrast to the embodiment in FIG. 3, clamping elements 3 and 4 therefore in this state are located not in the axial centre of bushing 1" but for reasons of symmetry in the centre of material strip 2". The distance of the clamping elements to the open front side 31 is larger than the distance to front side 30 with thrust washer 22.

In FIG. 5, bushing 1" shown in FIG. 4 is depicted after the joining of a second thrust washer 23. Thus, the bushing is shown in its installation form (without illustration of the bearing seat). Following this, clamping elements 3 and 4 are again arranged in the axial centre of the completed bushing 1".

As a matter of course, in the spirit of the invention, several clamping elements may be configured at each butt end instead of one clamping element. These clamping elements may be arranged in the same direction or alternatingly, i.e. several projections and the complementary recesses can be arranged at the same or at opposite joining ends.

The invention claimed is:

1. A plain bearing bushing with a cylindrical lateral surface which is formed from a material strip such that in the circumferential direction two joining ends are arranged adjacently, wherein at a first joining end a projection is arranged and at a second joining end a recess is arranged that is engaged with the projection in a formfitting manner, and wherein the projection and the recess are introduced into each other and connected to each other in frictionally engaged manner in the circumferential direction when the bushing is free-standing.

2. The plain bearing bushing according to claim 1, wherein, seen in projection onto the lateral surface, the projection is tapered in circumferential direction from its base side adjacent to the first joining end towards its free end without forming an undercut and in that the recess is configured complementary.

3. The plain bearing bushing according to claim 2, wherein the projection has two leg sides spaced apart in axial direction of which a first leg side, seen in projection onto the lateral surface, includes an angle $\alpha 1$ with the circumferential direction of 5° to 30° and a second leg side includes an angle $\alpha 2$ with the circumferential direction of 0° to 60°.

4. The plain bearing bushing according to claim 3, wherein the sum of angles $\alpha 1$ and $\alpha 2$ is of 10° to 60°.

5. The plain bearing bushing according to claim 3, wherein angles $\alpha 1$ and $\alpha 2$ according to the amount are of the same size.

6. The plain bearing bushing according to claim 1, wherein the projection is trapezoidal or trapezoid-shaped.

7. The plain bearing bushing according to claim 1, wherein a height h3 of the projection in circumferential direction is between 2 and 8 mm.

8. The plain bearing bushing according to claim 7, wherein a length L9 of the base side of the projection is between 2 and 6 mm.

9. The plain bearing bushing according to claim 1, wherein at least on one axial front side of the bushing is arranged a thrust washer.

10. The plain bearing bushing according to claim 1, wherein the projection is arranged in the axial center of the bushing.

* * * * *